United States Patent [19]
Spencer

[11] 3,742,313
[45] June 26, 1973

[54] SINGLE-WIRE CONTROL OF RCCB OR RELAY

[75] Inventor: William Meyer Spencer, West End, N.J.

[73] Assignee: The Bendix Corporation, Teterboro, N.J.

[22] Filed: June 11, 1970

[21] Appl. No.: 45,463

[52] U.S. Cl. .............................. 317/155.5, 317/60
[51] Int. Cl. ...................... H01h 47/00, H02h 1/00
[58] Field of Search ................................. 317/155.5

[56] References Cited
UNITED STATES PATENTS 3,483,432   12/1969   Neill.......................... 317/155.5 XR

*Primary Examiner*—L. T. Hix
*Attorney*—S. H. Hartz and Plante, Hartz, Smith and Thompson

[57] ABSTRACT

A circuit having single-wire control for operating a remote controlled circuit breaker with trip and reset coils, comprising switching means arranged to connect the trip or reset coil to a power source in response to a trip or reset signal applied to the single-wire control to energize the trip or reset coil for operating the circuit breaker accordingly.

1 Claim, 1 Drawing Figure

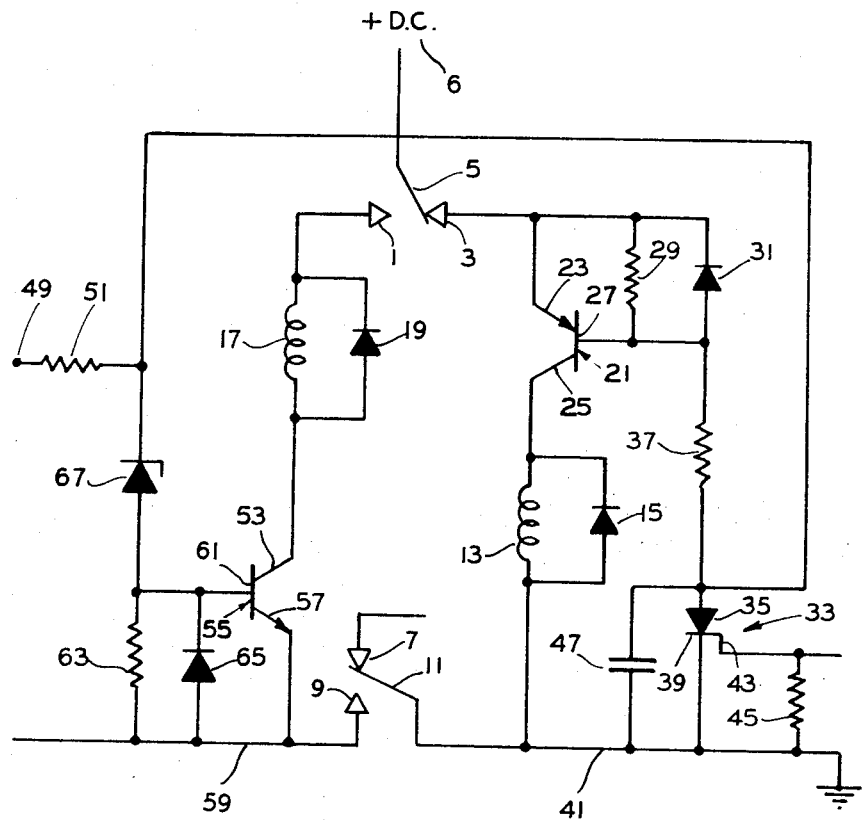

SINGLE-WIRE CONTROL OF RCCB OR RELAY

The invention relates to control circuits and more particularly to control circuits for operating two coil relays.

The invention is especially adapted for use in an Information Transfer System of the kind shown and described in copending application Ser. No. 45,462 filed Jan. 11, 1970, and assigned to the same assignee as the present application, where a substantial number of two coil relays are used as circuit breakers which must be tripped manually or automatically in response to a failure in the circuit and reset manually only after the failure is removed. A control circuit constructed according to the invention is especially desirable in an information transfer system of the kind shown and described in the above application because it requires only single-wire control of a remote controlled circuit breaker and in a system of the kind described where a thousand or more circuit breakers are used a substantial saving in weight and complexity results.

One object of the present invention is to provide a control circuit for controlling two coil relays, such as a remote controlled circuit breaker, which uses single-wire control.

Another object of the invention is to provide a control circuit which maintains the relay in tripped position as long as a failure remains in the associated circuit even though a manual reset command is provided.

Another object of the invention is to provide a control circuit with a fail-safe feature in case of a failure in the control circuit.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing shows a schematic diagram of a control circuit constructed according to the invention for operating a two coil relay, such as a remote controlled circuit breaker.

In the drawing, a relay has a pair of fixed contacts 1, 3 and a movable contact 5 alternately engaging fixed contacts 1, 3 and connected to a positive direct current source 6. The relay also includes a pair of fixed contacts 7, 9 and a movable contact 11 alternately engaging the fixed contacts. A trip coil 13, connected in parallel with a diode 15, when energized moves contacts 5 and 11 into engagement with contacts 1 and 9 respectively. A reset coil 17, connected in parallel with a diode 19, when energized moves contacts 5 and 11 into engagement with contacts 3 and 7, respectively. When the relay is used as a remote controlled circuit breaker it may include other contacts (not shown) connected in the circuits to be controlled and operated upon energization of the trip and reset coils.

A PNP type transistor 21 has an emitter 23 connected to fixed contact 3 and a collector 25 connected to trip coil 13 and controls energization of trip coil 13. Transistor 21 has a base 27 connected to emitter 23 by a parallel connected biasing resistor 29 and diode 31.

A silicon controlled rectifier 33 has a cathode 35 connected by a resistor 37 to base 27 of transistor 21 and an anode 39 connected to a ground lead 41. Silicon controlled rectifier 33 also has a gate 43 connected through a biasing resistor 45 to ground lead 41. A condenser 47 is connected to cathode 35 and to ground lead 41 in parallel with silicon controlled rectifier 33. Trip coil 13 also is connected to ground lead 41.

When a fault is detected in a circuit the circuit breaker is tripped automatically by a fault sensing device which applies a positive potential to gate 43 of silicon controlled rectifier 33 to render silicon controlled rectifier 33 conducting. Current flows from direct current source 6 through relay contacts 3, 5, biasing resistor 29, resistor 37 and silicon controlled rectifier 33 to ground. This drops the potential on base 27 of transistor 21 so the transistor 21 conducts and source 6 energizes trip coil 13 of the circuit breaker. Upon energizing of trip coil 13 movable contact 5 disengages fixed contact 3 and engages fixed contact 1 and movable contact 11 disengages fixed contact 7 and engages fixed contact 9. Additional contacts in the associated circuit also are opened to protect the circuit.

The relay may be tripped manually by grounding a control terminal 49 connected through a resistor 51 to resistor 37 to cause transistor 21 to conduct so that source 6 energizes trip coil 13. As described above, movable contacts 5 and 11 engage fixed contacts 1 and 9, respectively, when the circuit breaker is tripped.

Reset coil 17 is connected to fixed contact 1 and to the collector 53 of a NPN transistor 55. Transistor 55 has an emitter 57 connected to a lead 59 connected to fixed terminal 9 of the relay. Base 61 of transistor 55 is connected through parallel connected biasing resistor 63 and diode 65 to lead 59 and through a Zener diode 67 to resistor 51.

After the relay has been tripped and movable contact 5 engages fixed contact 1 and movable contact 11 engages fixed contact 9 the relay can be reset manually by applying a positive voltage to control terminal 49. A suitable bias then is provided on base 61 of transistor 55 because of current flow through resistor 51, Zener diode 67, resistor 63 and relay contacts 9, 11 to ground to cause transistor 55 to conduct so that reset coil 17 is energized by direct current source 6 through contacts 1, 5. Upon resetting the relay movable contact 5 disengages fixed contact 1 and engages fixed contact 3 and movable contact 11 disengages fixed contact 9 and engages fixed contact 7.

When movable contact 11 engages fixed contact 7 the base current circuit is open and prevents current flow through transistor 55 to provide proper logic operation.

The arrangement described also includes an anti-cycle feature which prevents the relay from being reset while there is an automatic fault signal applied to gate 43 of silicon controlled rectifier 33. A reset signal on control terminal 49 connecting the terminal to a positive potential source is shunted to ground through resistor 51 and silicon controlled rectifier 33 to maintain the reset signal at a potential low enough to prevent transistor 55 from conducting. Silicon controlled rectifier 33 continues to conduct until the reset signal is removed.

An additional advantage of a control circuit constructed according to the invention is that when control terminal 49 is faulted open with neither a positive reset signal or a grounded trip signal the relay remains in the same position it was in before the fault occurred and the relay still may be tripped automatically. Also, if control terminal 49 is inadvertently shorted to ground when the relay is in reset position, trip coil 13 is energized in the manner described above and the circuit breaker opens the circuit to provide a safety feature.

The control circuit described herein provides single-wire control of a relay, such as a remote controlled circuit breaker, with substantial saving in weight and complexity.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A circuit having single-wire control for operating a relay with trip and reset coils, comprising switching means connected to the trip and reset coils and to the single wire control, means for applying trip and reset signals to the single wire control for operating the switching means to energize the trip and reset coils accordingly for operating the relay, and fault sensing means for providing an automatic trip signal to a second switching means responsive thereto and connected to the trip coil switching means for operating the trip coil switching means, the second switching means being connected to the single wire control and preventing operation of the reset coil switching means while an automatic trip signal is present.

* * * * *